Nov. 9, 1971  H. MEMBRINO  3,618,286
BAG FILLING, SEALING AND SEPARATING SYSTEM
Filed June 8, 1970  4 Sheets-Sheet 1
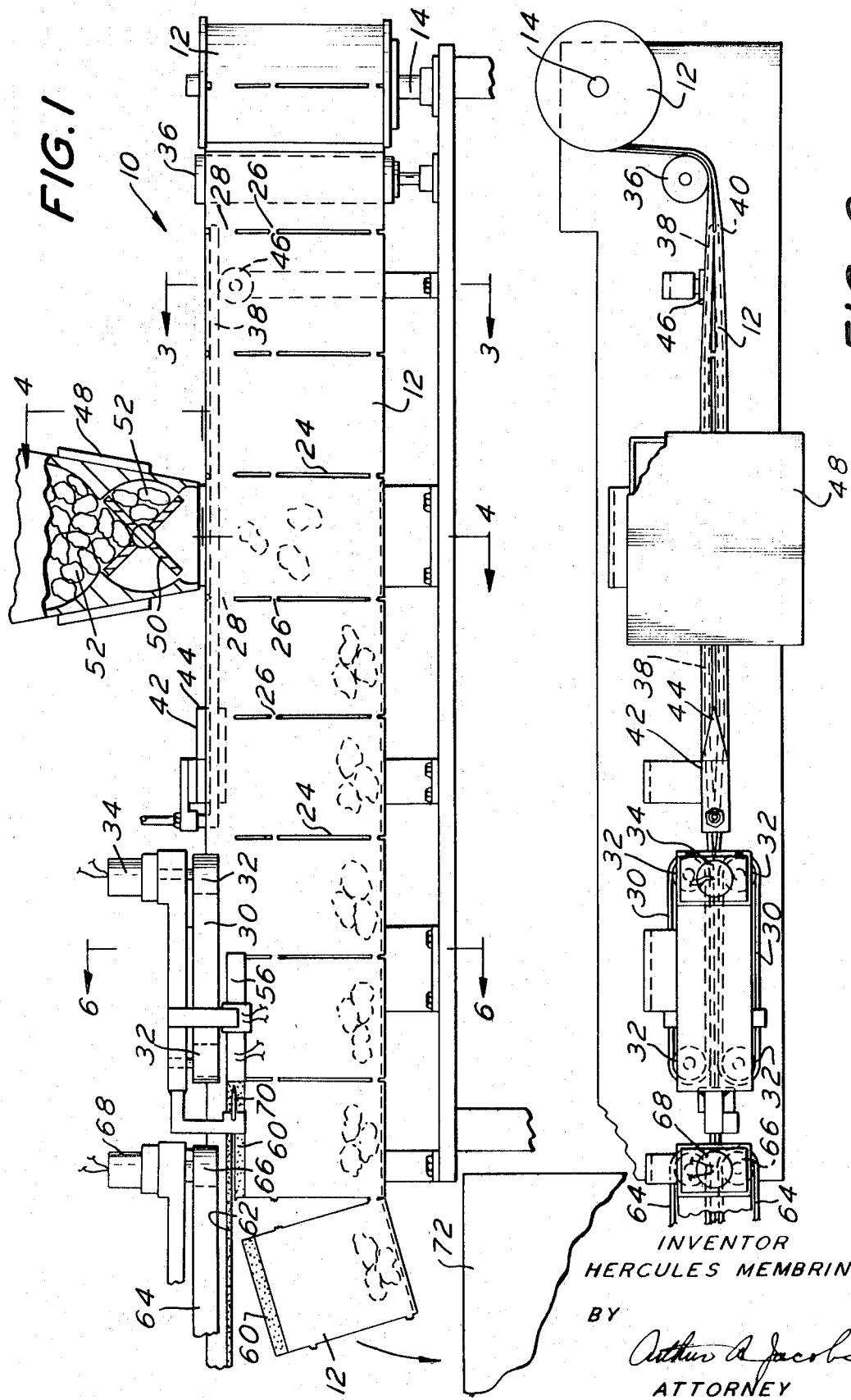
INVENTOR
HERCULES MEMBRINO
BY
Arthur A. Jacobs
ATTORNEY

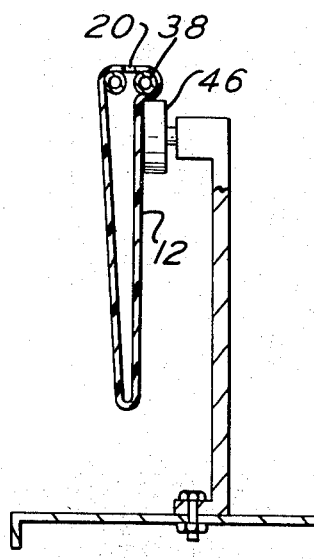
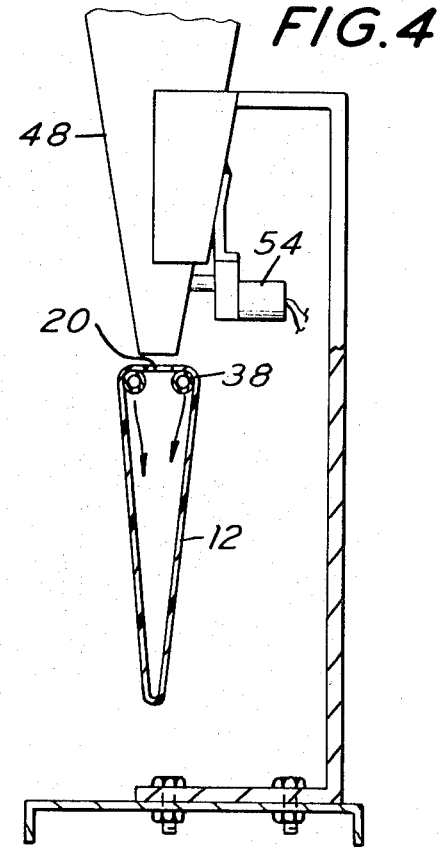
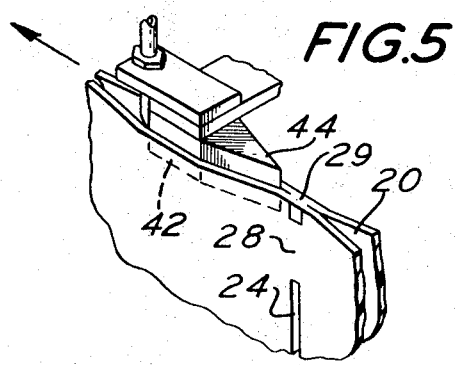
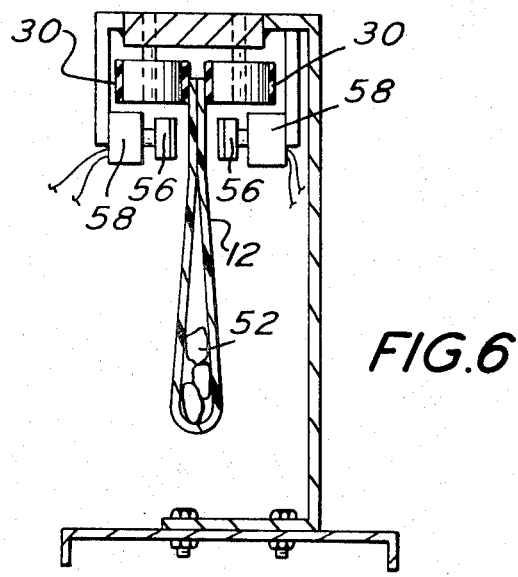
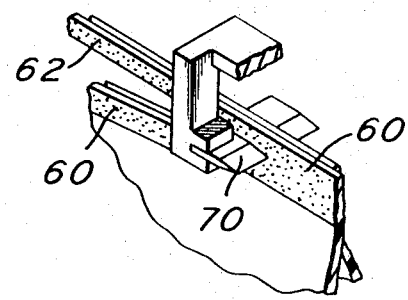
INVENTOR
HERCULES MEMBRINO

Nov. 9, 1971    H. MEMBRINO    3,618,286
BAG FILLING, SEALING AND SEPARATING SYSTEM
Filed June 8, 1970    4 Sheets-Sheet 3
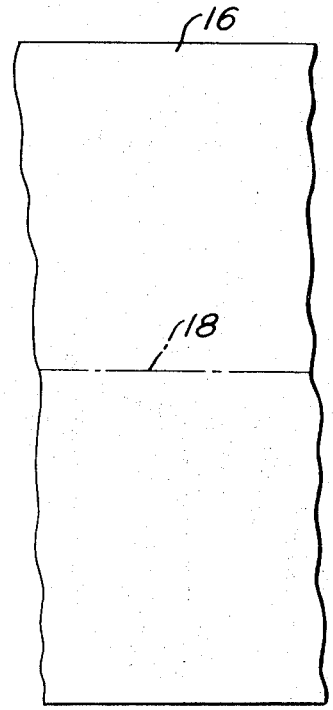
FIG.8
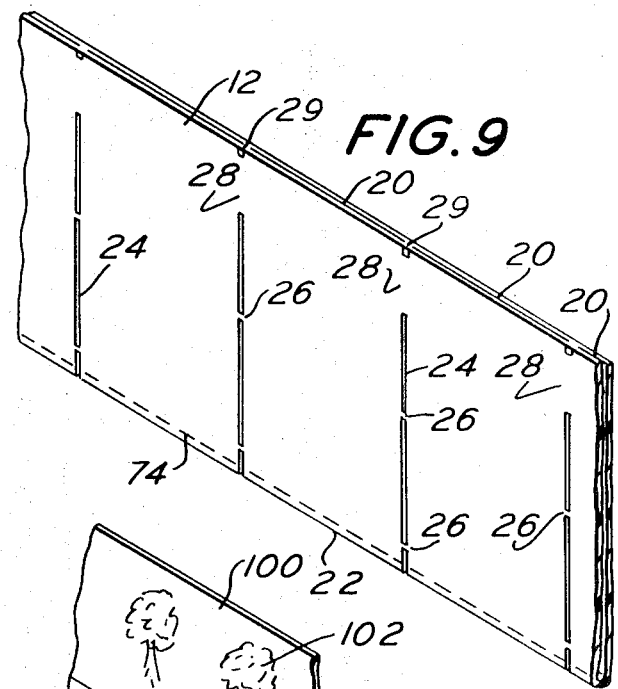
FIG.9
FIG.10
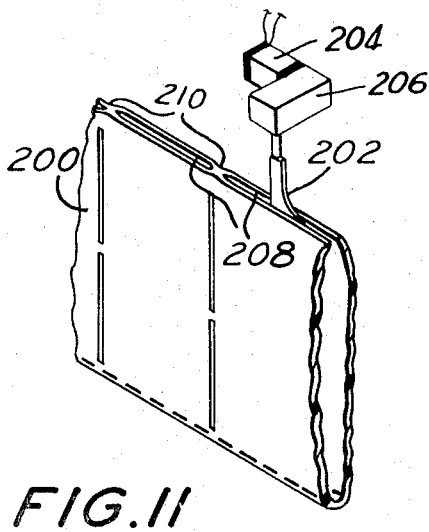
FIG.11
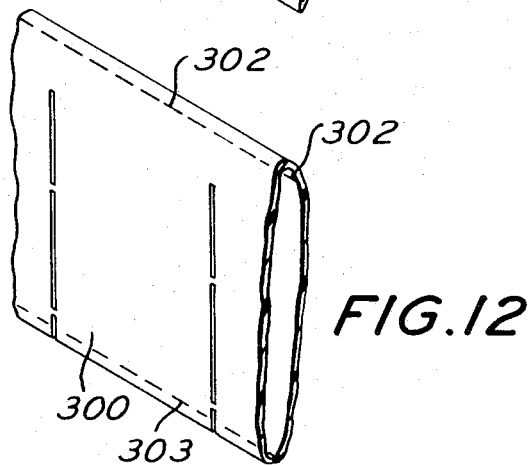
FIG.12
INVENTOR
HERCULES MEMBRINO
BY
*Arthur A. Jacobs*
ATTORNEY

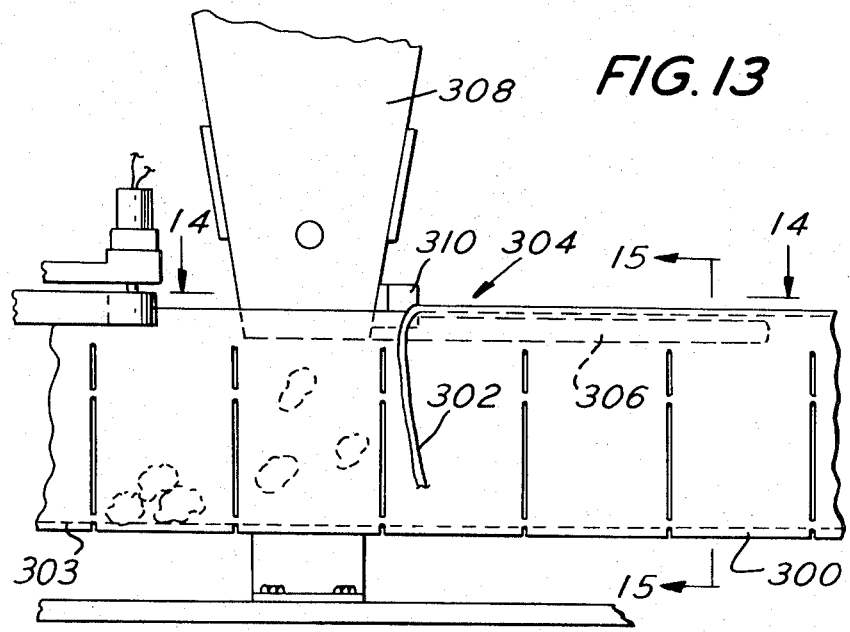
FIG. 13
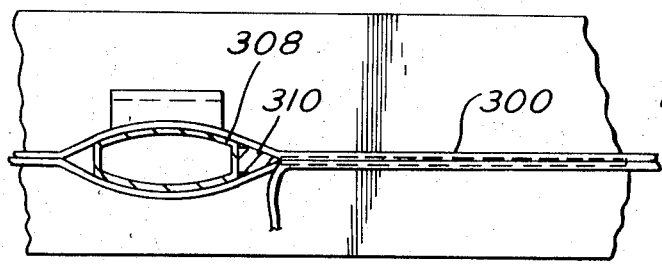
FIG. 14
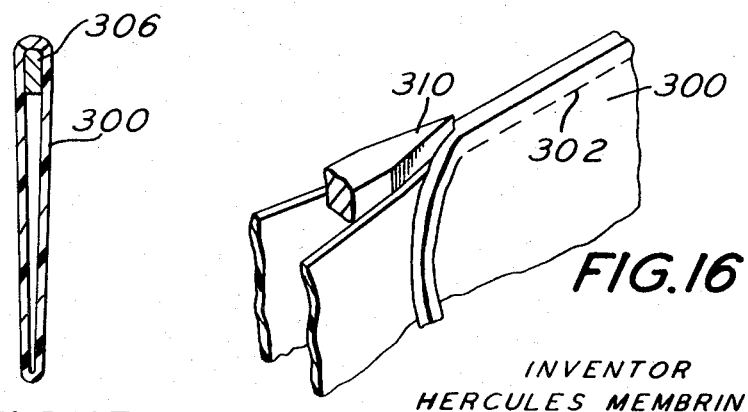
FIG. 15
FIG. 16
INVENTOR
HERCULES MEMBRINO
BY
ATTORNEY United States Patent Office 3,618,286
Patented Nov. 9, 1971

1

3,618,286
BAG FILLING, SEALING AND SEPARATING
SYSTEM
Hercules Membrino, 1934 Arch St.,
Philadelphia, Pa. 19103
Filed June 8, 1970, Ser. No. 44,186
Int. Cl. B65b 43/00
U.S. Cl. 53—29                                11 Claims

ABSTRACT OF THE DISCLOSURE

Thermoplastic bags formed in a strip, the bags being separated from each other in the strip by lines of seal and severance, each of these lines having at least one unsevered interruption therein, these interruptions forming connections between the bags, and systems for filling, sealing and separating the bags from each other, such systems including means for conveying the strip of bags below a filling hopper and then past a heat sealing means where the filled bags are sealed prior to separation from each other.

---

This invention relates to a method and means for filling and sealing bags, and it particularly relates to bags constructed of thermoplastic materials.

Bags made from such materials as polyethylene, polypropylene, polyvinyl alcohol, polyvinyl acetate, etc., or from such materials combined with other materials such as cellulosics and the like, have the desirable properties of being relatively inexpensive but yet relatively strong, so that they may be used as throw-away bags. However, it is not only necessary that the materials be strong and inexpensive, but also the construction of the bags must be accomplished in a rapid and inexpensive manner in order to make their manufacture commercially feasible. In addition, these bags, when used commercially to enwrap products for sale, must be capable of being easily and rapidly filled and sealed. This is best accomplished by utilizing bags which have been partially formed but which are still held together in strips while being filled. After being filled, the bags are sealed and then separated.

It is one object of the present invention to provide strips of bags, formed from either sheet or tubular stock, which are adapted to be most effectively utilized for rapid and easy filling, sealing and separating.

Another object of the present invention to provide a method and apparatus for filling, sealing, and separating bags from the aforementioned strips in a most efficient and rapid manner, whether such strips of bags are formed from sheet stock or from tubular stock.

Another object of the present invention is to provide a method and apparatus of the aforesaid type which can be used either continuously or intermittently.

Other objects and many of the attendant advantages of this invention will be readily appreciated as the same becomes better understood by reference to the following description when read in conjunction with the accompanying drawings wherein:

FIG. 1 is an elevational view of a system, embodying the present invention, for filling, sealing and severing bags made from sheet stock.

FIG. 2 is a top plan view of the system of FIG. 1.

FIG. 3 is a sectional view taken on line 3—3 of FIG. 1.

FIG. 4 is a sectional view taken on line 4—4 of FIG. 1.

2

FIG. 5 is an enlarged fragmentary perspective view showing the severing of the connecting portions between the bags in the system of FIG. 1.

FIG. 6 is a sectional view taken on line 6—6 of FIG. 1.

FIG. 7 is an enlarged fragmentary perspective view showing the severing of the selvage from the filled and sealed bags in the system of FIG. 1.

FIG. 8 is an enlarged fragmentary elevational view of the sheet stock used in forming the bags being processed in the system of FIG. 1.

FIG. 9 is an enlarged fragmentary perspective view of the strip of partially formed bags constructed from the sheet stock of FIG. 8.

FIG. 10 is an enlarged fragmentary perspective view of the sheet stock which has been pre-printed.

FIG. 11 is an enlarged fragmentary perspective view of partially formed bags made from tubular stock, showing one method of forming filling openings therein.

FIG. 12 is an enlarged fragmentary perspective view of partially formed bags made from tubular stock and utilized in the system of FIG. 13.

FIG. 13 is a fragmentary elevational view showing a system utilizing tubular stock of the type shown in FIG. 12.

FIG. 14 is a top plan view taken on line 14—14 of FIG. 13.

FIG. 15 is a sectional view taken on line 15—15 of FIG. 13.

FIG. 16 is an enlarged fragmentary perspective view showing the method of severing the perforated line of the connected bags made from tubular stock as shown in FIG. 12 after they have been filled.

Referring now in greater detail to the various figures of the drawings wherein similar reference characters refer to similar parts, there is shown, in FIG. 1, a system, generally designated 10, comprising a roll of partially formed polyethylene bags 12 mounted on a spindle 14. The partially formed bags 12 are formed from a sheet of polyethylene which has been overlapped along its longitudinal center line to form two plies. The two-ply strip is then provided with spaced lines of seal and severance having interruptions or nips constituting unsealed and unsevered portions. The original sheet stock 16 is illustrated in FIG. 8 where the center line is shown at 18, while the partially formed strip of bags 12 is illustrated in FIG. 9 and shows the double-ply construction forming open ends 20 and closed ends 22. The lines of seal and severance are shown at 24. Nips or unsealed portions are shown at 26 and 28, the nips 28 being somewhat larger than the nips 26. At the upper edge, above the nips 28, small sealed but not severed portions are provided at 29. These imperforate portions 29 may be utilized for hanging the bags on the mandrel (hereinafter described) during filling.

The method and apparatus for making these partially formed bags 12 do not form part of this invention but may comprise any desired means. Illustrative of such bag-forming means are those illustrated in applicant's U.S. Pat. No. 3,233,527 or in applicant's co-pending U.S. application Ser. No. 874,523, filed Nov. 6, 1969.

The strip of partially-formed bags 12 are pulled off the roll on the spindle 14 by the movement of endless belts 30 (see FIGS. 1 and 2) which are mounted on pulleys 32 and are actuated by an electrical motor 34.

As the strip of bags move along the machine, they pass over a guide roller 36 and over a mandrel 38. The mandrel 38 is an elongated tube bent to form two arms. The elbow portion 40 of the tube forms a relatively narrow apex from which the arms incline laterally outward in opposite directions to form a widening portion. The free ends of the arms, opposite the apex 40, are attached to opposite sides of a block 42 having a knife-like edge 44. The arms of the mandrel 38 may be imperforate or they may be provided with spaced apertures, in which case, the interior of the arms would be connected to a source of air or other gas under pressure.

The mandrel 38 causes the openings 20 of the partially-formed bags to open or spread and, if the apertures and gas under pressure are used, the gas flows through the apertures into the bags to cause the plastic sides of the bags to spread away from each other. The latter feature is optional and is not illustrated since, by itself, it forms no part of the present invention. It is, however, illustrated in the aforesaid U.S. Pat. No. 3,233,527 as well as in applicant's U.S. Pat. No. 3,393,493. Unlike the mandrel in theses patents, however, the mandrel 38 also serves as a hanger from which the bags 12 are suspended.

A guide roller 46 supports mandrel 38 at the receiving end thereof.

While the partially-formed bags 12 move along the mandrel 38 they pass beneath a hopper 48. The hopper 48 illustrated is provided with a star-valve 50 which meters the articles 52, to be packed, into the individual bags 12, through the spread openings 20. The valve 50 is actuated by an electrical motor 54 (see FIG. 4) in a preset timed rotation to correspond to the movement of the strip 12. However, any other type of feasible feed means, either intermittent or continuous, may be substituted, if desired.

As the filled bags continue their progress, they move against the knife edge 44 which acts to sever the sealed or imperforate portions 29. As the portions 29 are severed, the filled bags, now connected only by the nips 26 and 28, are gripped by the endless belts 30 which hold and move them between a pair of inwardly reciprocating heat-sealing bars 56 (see FIGS. 1 and 6) which are electrically heated and which are actuated by electrical motors 58 in timed relation with the star-valve 50.

The sealing bars 56 form a sealed top portion 60 on each bag (see FIGS. 1 and 7). The excess portion or selvage 62 of this sealed portion is removed as the filled bags, now gripped at their upper ends by endless belts 64, mounted on pulleys 66 and actuated by an electrical motor 68, move past a knife 70 (see FIGS. 1 and 7). The filled and sealed bags are then broken away at their remaining nip portions and fall into a storage bin 72.

The use of sheet stock, such as described above is, in many ways, preferable to tubular stock. For example, it is possible to print both sides of the bags in a simple and efficient manner. This is accomplished by pre-printing each half of the stock in regularly spaced areas, as shown in FIG. 10 where the sheet stock 100 is pre-printed at regular intervals with indicia or designs such as indicated at 102. The stock is then overlapped and the bags are formed in the regular manner, prior to being wound into the roll and placed on the spindle 14.

If desired, a line of perforations, indicated at 74 may be provided. This can be subsequently used to form a pullaway strip for opening the bags to remove the contents.

If tubular stock is used, means must be provided for forming filling openings therein. One such means is illustrated in FIG. 11 where a strip of partially formed bags 200, formed from the tubular stock, is passed by a reciprocating knife 202 actuated by an electrical motor 204 through gas box 206 operated in timed relation with the star-valve or other filling means. The knife 202 is positioned adjacent the mandrel and forms slits 208 which are spaced from each other by unslitted or imperforate portions 210. This is similar to the method illustrated in the aforesaid U.S. Pat. No. 3,233,527 and U.S. Pat. No. 3,393,493.

Another and somewhat simpler method for providing filling openings in bags made from tubular stock, and utilizing such bags in a filling and sealing method, is illustrated in FIGS. 12 to 16.

FIG. 12 shows a tubular type of stock 300 which is provided with a line of perforations 302 adjacent the top edge. A similar line of perforations, as at 303, may also be provided adjacent the other edge to serve the same purpose as the perforations 74 shown in FIGS. 1 and 9. This type of tubular stock is utilized with the mechanism illustrated in FIG. 13, and which is generally designated 304. The mechanism 304 is similar to the mechanism 10 of FIG. 1 and includes the same type of mandrel 306. However, here the feed hopper 308, otherwise similar to that shown at 48, depends below the plane of the mandrel and is provided with a cutting edge or knife 310.

In operation, as the partially-formed bags pass along, the knife 310 severs the bags at the perforations 302, thereby providing both filling openings and partial separation of the bags. As the bags continue to move forward, the slit top portions encompass the lower portion of the hopper, which thereby acts as both a spreading means and a filling means (note FIG. 14). The process then proceeds in the same manner as described with respect to the mechanism of FIG. 1.

I claim:

1. A method of filling and sealing thermoplastic bags which comprises passing a strip of bags over a mandrel, the bags being separated from each other in the strip by lines of seal and severance each of said lines of seal and severance having at least one unsevered interruption therein, said interruption forming a connecting nip, and said bags each being provided with a filling opening spreading said filling openings while moving said bags under a filling means to receive filling material, heat sealing said bags adjacent said openings, and then separating said bags by breaking the connecting nips.

2. The method of claim 1 wherein said bags have connecting means at each end of the filling openings, the step of severing said connecting means after filling and prior to heat sealing.

3. The method of claim 1 wherein said strip is formed from sheet stock that has been linearly folded to form two plies, said filling openings being defined by the two plies.

4. The method of claim 1 wherein said strip is formed from tubular stock and said bags have a connecting strip defined by a perforated line, the step of severing the connecting strip along the perforated line prior to filling to provide the filling openings.

5. The method of claim 1 wherein said strip is formed from tubular stock, the step of intermittently cutting one end of said stock to form filling openings defined at each end by imperforate connecting means.

6. A system for filling, sealing and separating bags which are connected to each other in a strip, said system comprising a mandrel, means for moving a strip of bags over the mandrel, and past a feed means, said bags being separated from each other in the strip by lines of seal and severance, each such line having at least one unsevered interruption therein, said interruptions forming connecting means between the bags, said mandrel being constructed and arranged to support each bag at one edge thereof, said one edge of each bag having a filling opening which is spread apart as it moves past said feed means, said feed means including means to insert articles through said spread apart filling opening, means to move the filled bags, while still connected in said strip, through a sealing station, and means at said sealing station to heat-seal the filling opening in each bag.

7. The system of claim 6 wherein the filling openings are pre-formed in the bags and the mandrel acts to spread said openings.

8. The system of claim 6 wherein a reciprocating cutting means is positioned forwardly of the feed means to cut spaced slits in said strip, said slits forming said filling openings.

9. The system of claim 6 wherein said strip is provided with a perforated line adjacent at least one edge, and cutting means positioned forwardly of the feed means to sever the strip at this perforated line prior to each successive bag reaching the filling means.

10. The system of claim 6 wherein a cutting means is positioned rearwardly of said sealing station, said cutting means being constructed and arranged to sever waste portions of the sealed bags therefrom and to permit the sealed bags to break away from said waste portions and from each other.

11. The system of claim 6 wherein said feed means comprises a hopper having an end portion, the filling openings in the bags encompassing said end portion and being spread thereby as said bags move past said feed means.

References Cited
UNITED STATES PATENTS

| | | | |
|---|---|---|---|
| 3,359,703 | 12/1967 | Quaadgras | 53—180 |
| 3,453,799 | 7/1969 | Cloud et al. | 53—29 |
| 3,466,841 | 9/1969 | Rausing | 53—180 X |

BERNARD STICKNEY, Primary Examiner

U.S. Cl. X.R.

53—180, 187, 384; 229—53